United States Patent [19]

Broom

[11] Patent Number: 4,949,743
[45] Date of Patent: Aug. 21, 1990

[54] FLUIDIZATION OF HEAVY SLURRIES

[75] Inventor: Henry T. Broom, Richmond, Tex.

[73] Assignee: NALCO Chemical Company, Naperville, Ill.

[21] Appl. No.: 132,836

[22] Filed: Dec. 14, 1987

[51] Int. Cl.$^5$ .......................... F17D 1/17; F17D 1/18; B01J 13/00

[52] U.S. Cl. ...................................... 137/13; 252/312; 44/51

[58] Field of Search ............... 252/312; 44/51; 137/13; 208/13

[56] References Cited

U.S. PATENT DOCUMENTS

| | | | |
|---|---|---|---|
| 4,222,862 | 9/1980 | Finch | 209/166 |
| 4,251,229 | 2/1981 | Naka et al. | 44/51 |
| 4,355,651 | 10/1982 | McClaflin | 137/13 |
| 4,398,919 | 8/1983 | Zakaria | 44/51 |
| 4,539,099 | 9/1985 | Merchant et al. | 208/177 |
| 4,604,188 | 8/1986 | Yan et al. | 44/51 |
| 4,618,348 | 10/1986 | Hayes et al. | 44/51 |
| 4,646,771 | 3/1987 | Prasad et al. | 137/13 |
| 4,725,287 | 2/1988 | Gregoli et al. | 44/51 |

OTHER PUBLICATIONS

CA97 (4):28531a The use of polyacrylamide as flocculating agent, V. B. Mathur; D. M. Brahmankar -19-82-Indian Drugs 19(8), 323-325.
CA96 (24):214922u Sludge dewatering, 1986, Izv. Vyssh. Uchebn. Zayei., Khim. Khim. Tehnol., 29(11), 67-71.
CA105(16):136366t The effect of carboxymethyl cellulose on the flotation and surface properties of graphite-J. A. Solari; A. C. De Araujo; J. S. Laskowski -1986-Coal Prep. (Gordon & Breach), 3(1), 15-31.
CA102(18):154319x Sludge dewatering, Jpn. Kokai Tokkyo Koho JP 59/230699 A2 (84/230699), 25 Dec. 1984, 5 pp. Appl. 83/106330, 14 Jun. 1983.
CA96(24):204922u Jpn. Kokai Tokkyo Koho Jp 57/32797 A2(82/32797), 22 Feb. 1982, 8 pp. Appl. 80/108213, 8 Aug. 1980, 1982.
CA96(16):129182x Jpn. Kokai Tokkyo Koho JP 56/161897 A2(81/161897), 12 Dec. 1981, 4 pp. Appl. 80/65409, 19 May 1980, 1981.
CA94(26):214072q Jpn. Kokai Tokkyo Koho JP 55/145509 (80/145509), 13 Nov. 1980, 3 pp. Appl. or Pr. 79/51358, 27 Apr. 1979, 1980.
CA98(6):40132z Appl. 81/16866, 9 Feb. 1981, 1982.
CA98(6):40047a Municipal sewage water treatment-some colloid chemical aspects, Jean C. Le Bell, Stockholm S-114 86, Swed. Vattern, 38(3) 294-305 1982.
CA97(6):40551q Evaluation of flocculating agents with a new testing apparatus, Bernhard Borchers Zellst. Pap. (Leipzig), 31(3), 117-120, 1982.
CA99 (20):163482s Coagulation and sedimentation in chemical precipitation of wastewaters, Jean C. Le Bell; Per Stenius; Claes Axberg Water Res., 17(9), 1073-1080, 1983.
CA98(18):149429c Purification of Water, Pieter Walter William Buchan; Leon Buchan Eur. Pat. Appl. EP 66421 A1, Dec. 8, 1982, 23 pp. Designated States BE, DE, FR, GB, IT, NL, SE Appl. 82/301570, May 20, 1982; ZA Appl. 81/3427, May 21, 1981; AZ Appl. 81/4437, Jun. 30, 1981; ZA Appl. 81/6505, Sep. 18, 1981, 1982.
CA106(14):107470n Sludge dewatering, Kazumasa Watanabe; Masamitsu Oshima-Jpn. Kokai Tokkyo Koho JP 61/204100 A2 (86/214100), Sept. 10, 1986, 6 pp. Appl. 85/44607, Mr. 8, 1985, 1986.
CA94(12):85235u Cellulose derivatives as flocculants compared with some fully synthetic products, H. L. Doppert; J. K. Schuilenburg Int. Dissolving Pulps Conf., (Conf. Paper) 5th, 140-146 TAPPI; Atlanta, GA. 1980.
CA93(24):226259Y Study of the absorption of carboxymethyl cellulose and polycarylamide on cation-substituted forms of montmorillonite, N. S. Ivanova; F. F. Mozheiko Vestsi Akad. Navuk BSSR, Ser. Khim. Navuk, (5), 112-117, 1980.
CA93(4):32260w Physicochemical and rheological investigation of inorganic suspensions, IX. Coagulation and flocculation of particles, Mieczyslaw Gorecki Acta Pol. Pharm., 36(6), 591-596, 1979.
CA92(2):11056Y Turbid water clarification, Koichi Hahazato; Mitsuo Yamawaki Jpn. Kokai Tokkyo Koho
(List continued on next page.)

*Primary Examiner*—Richard D. Lovering
*Assistant Examiner*—Daniel S. Metzmaier
*Attorney, Agent, or Firm*—Donald G. Epple; John G. Premo; Anthony L. Cupoli

[57] ABSTRACT

A process for fluidizing oily heavy slurries chosen from slurries of catalyst fines in hydrocarbon, coke slurries in hydrocarbon, and asphalt residues in hydrocarbon which comprises: (1) heating, with effective mixing, the oily heavy slurries to at least 140° F., thereby forming a heated heavy slurry; (2) Adding to said heated heavy slurry with effective mixing, an effective fluidizing amount of a fluidizing agent which comprises the ingredients:

| Ingredient | Wt. Percent |
|---|---|
| (a) water | 15-85 |
| (b) an ethoxylated nonyl phenol/formaldehyde resin having a molecular wt. between about 1000-25,000 | 40-5 |
| (c) Surfactants having an HLB bwtween about 2.0-25.0; said surfactants chosen from the group consisting of alkanolamide condensates, alkoxylated fatty alcohol phosphates and mixtures thereof; and | 40-5 |
| (d) liquid organic solvents chosen from the group consisting of napthas, aromatic napthas, heavy aromatic napthas, alkylated aromatics, light aromatic petroleum distillates, turpentine, dipentene rich turpentine, and mixtures thereof; thereby forming a heated treated heavy slurry, and then mixing effectively until the heated treated heavy slurry becomes fluidized and pumpable. | 75-5 |

6 Claims, No Drawings

OTHER PUBLICATIONS

JP 54/132352(79/132352), Oct. 15, 1979, 5 pp. Appl. or Pr. 78/39741, Apr. 6, 1978, 1979.

CA91(16):128620Y Flocculation-separation of starch from wastewaters, Katsuo Shinoda; Kozo Kanamori; Michio Kusaka Jpn. Kokai Tokkyo Koho JP 54/69252 (79/69252), Jun 4, 1979, 5. pp. Appl. or Pr. 77/137985, Nov. 14, 1977, 1979.

CA91(12):96488t Flocculant for clarifying surface waters, Kh. Talibdzhanov; G. N. Zinina; A. Abidkhanov U.S.S.R. SU 659575, Apr. 30, 1979 from: Otkrytiya, Izobret., Prom. Obraztsy, Tovarnye Znaki 1979, (16), 118 Appl. or Pr. 2479227, Apr. 25, 1977, 1979.

CA90(8):56575s Determination of the substitution--grade of soluble CMC by means of polyelectrolyte titration, Luu Trong Hong; Bodo Dorrmeister; Horst Dautzenberg; Burkart Phipipp Zellst. Pap. (Leipzig, 27 (5), 207–210, 1978.

CA89(20):168583d Treatment of solid-containing waste waters, Hikosaburo Hashisaki Japan, Kokai JP 53/74748(78/74748), Jul. 3, 1978 3 pp. App. or Pr. 76/151426, Dec. 15, 1976, 1978.

CA89(16);135251r Flocculation treatment of wastewaters, Ieaki Yamafuju; Shozo Sasaki; Masamichi Kimura; Shinichi Hayakawa Japan Kokai Jp 53/69458 (78/69458), Jun 20, 1978 6 pp. Appl. or Pr. 76/143507, Dec. 1, 1976, 1978.

CA89(14):117467m Use of carboxymethyl cellulose for improving the quality of surface water purification, A. Abidkhanov; G. N. Zinnia; E. G. Amosova Deposited Doc., VINITI 4053–4076, 13pp. Avail. VINITI 1976.

CA89(12):94600h Effect of water soluble polyanions on the removal of organic substances by a metal coagulant from fisheries waste water, Eiichi Nishide Nihon Daigaku Nojuigakubu Gakujutsu Kenkyu' Hokoku, 35, 335–341, 1978.

CA89(8):64679y Improvement of silt filtration, Ryonosuke Abe; Hisae Kamono; Yasuhisa Osada; Yoshinori Kasuga Japan Kokai JP 52/148953 (77/148953), Dec. 10, 1977, 3pp. Appl. or Pr. 76/65560, Jun. 7, 1976, 1977.

CA88(12):78925s Removal of suspended particles from water, A. Abidkhanov; Kh. Talibdzhanov; G. N. Zinina; A. Kh. Ginzburg U.S.S.R. SU 579226, Nov. 5, 1977 From: Otkrytiya, Izobret., Prom. Obraztsy, Tovarnye Znaki 1977, 54(41), 76 Appl. or Pr. 2301159, Dec. 19, 1975, 1977.

CA87(14):106395u Coagulation of fishery waste water with organic coagulants, Eiichi Nishide Nihon Daigaku No-Juigakubu Gakujutsu Kenkyu Hokoku, 34, 291–294, 1977.

CA86(16):111075y Treatment of industrial water in the production of asbestos-cement, Vladimir Vyplel Czech. CS 163311, Jun. 15, 1976 2 pp. Appl. or Pr. 73/6599, Sep. 25, 1973.

CA85(22):166096r Decrease of total suspension solids content in waste waters from the pulp and paper industry using coagulant chemical agents, Elena Strugariu Rev. Padurilor-Ind. Lemnului, Celul. Hirtie, Celul. Hirtie, 25(1), 27–34, 1976.

CA84(18):126319p Sewage treatment with activated fly ash and regenerated alum sludge, M. Adhikari; S. K. Gupta; B. Banerjee, J. Inst. Chem., Calcutta, 47, Pt. 5, 165–169, 1975.

CA84(10);60713d Electrocoagulation of water-soluble polymers, Kazuo Nishizawa Japan, Kokai JP 50/140546 (75/140546), Nov. 11, 1975, 4pp. Appl. or Pr. 74 33,891, Mar. 28, 1974.

CA84(4):21842a Treatment of waste waters containing water-soluble high molecular weight compounds with montmorillonite and metallic compounds, Kazuji Fukunaga; Kuniyuki Kano, Japan Kokai JP 50/94042 (75/94042), Jul. 26, 1975, 7pp. appl. or Pr. 73 97,079, Aug. 28, 1973.

CA83(12):10294p Compsosition for removing cationic materials from industrial waste waters, Hans Wegmueller, Jaroslav Haase, Ger. Offen. DE 2451776, May 15 1975; 39 pp. CH Appl. 15,716/73, Nov. 8, 1973.

CA83(4):30217g Recovering noil fibers and soluble wood material from waste water, Esko K. Brax, U.S. US 3,873,418, Mar. 25, 1975, 6 pp. Appl. or Pr. 9937, Feb. 9, 1970.

CA83(2):15300k Treatment of waste dyeing solution, Kosuke Tomita; Hiroaki Ida; Hiroshi Matoba; Katsutoski Yoshihara, Japan Kokai JP 49/116857 (74/116857), Nov. 8, 1974, 3 pp. Appl. or Pr. 73 28,764, Mar. 12, 1973.

CA82(16):102894e Treatment of oil spills using basic polymer oil-ball forming agents, Keiji Abe; Shigeru Tomita; Yoshindo Matsuda; Kazuki Terajima; Tadao Kanayama, Japan Kokai JP 49/89687), Aug. 27, 1974, 4 pp. Appl. or Pr. 73 1588, 27 Dec. 1972.

CA82(2):7476m Purification of waste water by coagulative precipitation, Akio Okamoto; Yoritaka Kudo, Japan Kokai JP 49/71755), Jul. 11, 1974, 3 pp. Appl. or Pr. 72 113,668, Nov. 13, 1972.

CA81(16):95971b What are the agents used for retention and as flocculants, Werner Auhorn Papeterie, 96(5), 289–290, 293–299 1974.

CA81(12):68127z Synthesis of previously unknown water-soluble graft copolymers having the qualities of flocculants, Tr. Nauchnoizsled. Inst. Vodosnabdyavane, Kanaliz. Sanit. Tekh, 8(2), 179–198, 1973.

CA79 (16):96652u Treating dye waste waters with carboxyl compounds and polyvalent metallic compounds, Takehiko Kano Japan. Kokai JP 48/33181 (73/33181), May 8, 1973, 3 pp. Appl. or Pr. 71 65,428, 26, Aug. 1971.

CA79(16):95133p Improvement in the action of high--molecular-weight flocculants during the flotation beneficiation of potassium ores using additives of iron and aluminum inorganic salts, Kh. M. Aleksandrovich; F. F. Mozheiko; A. P. Yanovskaya; N. S. Ivanova, Khim. Prom (Moscow), 49 (6), 439–442, 1973.

CA79(10):55450h Flocculating oil-and clay-containing slimes, William J. Lang; Donald A. Hentz, U.S. US 3,723,310, Mar. 27, 1973, 5 pp. Appl. or Pro. 864,518, Oct. 7, 1969.

CA78(14):86175f Retention and flocculation mechanisms, Jan Fellegi Pap. Celul., 27(11), 213–216, 1972.

CA78(2):7539b Coagulation of paper mill wastes by polyelectrolytes, Shizuo Suzuki, Eisei Kagaku, 18(4), 274–277, 1972.

(List continued on next page.)

OTHER PUBLICATIONS

CA77(26):166465v Recovery of fibers and fillers from paper industry waste water, Oszkar Libor, Ger. Offen. DE 2121198, 31 Aug. 1972, 27 pp. HU Appl. TA/1104, 22 Feb. 1971.

CA77(18):116365s Characterization by differential thermal analysis of organic polyelectrolytes and flocculating agents, Charles B. Concilio; Betty J. Jahnke, Thermochimica Acta, 4(3), 249–255, 1972.

CA76(14):73156j Behavior of water-soluble cellulose ethers toward electrolytes, Werner Hansi; Walter Klaus; Karl Mercator Deut. Farben-Z, 25(10), 493–498, 1971.

CA75(6):38684n Apparatus for separating water from hydrocarbons, John R. Winston; Roy E. Hook, U.S. US 3,583,904, Jun. 8, 1971, 6 pp. 22 Jan. 1969.

CA73(26):132140n Removal of pulp in white water by coagulation, Shizuo Suzuki, Kogyo Yosue, No. 122, 35–39, 1968.

CA73(10):48468t Water clarification, Oscar Libor; Gyorgy Kollar Hung. HU 157437, Apr. 22, 1970, 13 pp.

CA71(24):114345n Behavior of water-soluble cellulose ethers towards electrolytes and organic solvents, Werner Hansei; Walter Klaus; Karl Mercator, Weisbaden-Biebrich, Ger. Deut. Farben-Z, 23(7), 305–310 1969.

FLUIDIZATION OF HEAVY SLURRIES

INTRODUCTION

In operating petroleum processing plants, particularly when these operations include catalytic operations using heterogeneous catalysts, the processor is faced with a problem of separating catalysts fines from by-product streams, which problem poses a major problem for environmental controls, utilization of plant equipment, and cost and expenditures.

In addition to these catalysts fine slurries, other oily heavy slurries include slurries containing coke or asphalt components dispersed in high viscosity hydrocarbons. These heavy slurries which contain catalyst fines, including accumulated alumina/silica zeolitic catalyst fines which settle from hydrocarbon cuts obtained from fluid catalytic cracking units, and which heavy slurries can also include coke slurries and asphalt slurries in hydrocarbon dispersing solvents, when accumulated have a tendency to settle into a very heavy slurry phase and lighter hydrocarbon phase. The hydrocarbon phase most normally can be pumped from on top of the heavy slurries, but this leaves the heavy slurry accumulated in tankage, in lines, and posing tremendous operating problems for the oil refiner.

It would be an advance in the art if one could easily treat these oily heavy slurries in such a manner as to make them dispersible and pumpable, thereby permitting them to be pumped to disposing operations such as incinerators, and the like. THE INVENTION My invention is a process for fluidizing oily heavy slurries chosen from slurries of catalyst fines in hydrocarbon, coke slurries in hydrocarbon, and asphalt residue slurries in hydrocarbon, which process comprises: (1) Heating, with effective mixing, the oily heavy slurries to at least 140° F., thereby forming a heated heavy slurry; (2) Adding to said heated heavy slurry, with effective mixing, an effective fluidizing amount of a fluidizing agent comprising:

| | Ingredient | Wt. Percent |
| --- | --- | --- |
| (a) | water | 15–85 |
| (b) | an ethoxylated nonyl phenol/ formaldehyde resin having a molecular wt. between about 1000–25,000; | 40–5 |
| (c) | Surfactants having an HLB between about 2.0–25.0, said surfactants chosen from the group consisting of alkanolamide condensates, alkoxylated fatty alcohol phosphates and mixtures thereof; and | 40–5 |
| (d) | liquid organic solvents chosen from the group consisting of naphthas, aromatic naphthas, heavy aromatic naphthas, alkylated aromatics, light aromatic petroleum distillates, turpentine, dipentene rich turpentine, and mixtures thereof; thereby forming a heated treated heavy slurry, and then mixing effectively until the heated treated heavy slurry becomes fluid and pumpable. | 75–5 |

The temperature at which these ingredients are admixed with the oily heavy slurries should be at least 140° F., preferably between 150°–200° F., and most preferably between about 160°–190° F.

By the term effective mixing we mean to include any form of agitation or mixing which can evenly and homogeneously disperse the fluidizing ingredients in, into and among the heavy oily slurries. This mixing can be accomplished by inserted mixters or may be accomplished by circulation pumping into and through the vessel in which the oily heavy slurries have settled. Mixing may also include ultrasound mixing or any other physical technique that can accomplish the admixture of the fluidizing amount of the fluidizing ingredients into and throughout the oily heavy slurries.

THE FLUIDIZING INGREDIENTS

The fluidizing ingredients are preferrably admixtures which contain water, an ethoxylated nonyl phenol-formaldehyde resin, and various types of surfactants having hydrophilic-lipophilic balances (hereinafter HLB) ranging between about 2.0–25.0, said surfactants being chosen from the group consisting of alkanolamide condensates, alkoxylated fatty phosphates, and any effective admixture thereof. When admixtures are used, the HBL of the admixture may also range from between 2–25. To this formulation, organic solvents are added which solvents may include any of the typical and inexpensive organic crude oil cuts such as naphthas, aromatic naphthas, heavy aromatic naphthas, alkolated aromatics, light aromatic petroleum distillates, or such other solvents such as turpentines, dipentene rich turpentines, or any admixture of the above type ingredients which admixture may also include other common solvents such as cyclohexane, toluene, ethylbenzene and such other types of organic solvents as may readily be available.

The ingredients which appears to be active in the dispersion of these oily heavy slurries and which help to achieve the ability to fluidize and pump these slurries seems to be the admixture of water, the ethoxylated nonyl phenol-formaldehyde resins, and the particular surfactants described above and below, in admixture with organic solvents. It is particularly useful to have present both water and organic solvents in combination with the ethoxylated nonyl phenol-formaldehyde resin and the surfactants or admixture of surfactants.

The ethoxylated nonyl phenol-formaldehyde resin normally has a molecular weight ranging between about 1000–25,000 as the weight average molecular weight as determined by gel permeation chromotography. Preferably the molecular weight ranges between about 2500–20,000 and most preferably the molecular weight ranges between about 5,000–15,000. These ethoxylated nonyl phenol-formaldehyde resins are made by condensing nonyl phenol and formaldehyde followed by ethoxylation using anywhere from 1–20 moles of ethylene oxide per mole of nonyl phenol/formaldehyde to achieve the ethoxylated nonyl phenol-formaldehyde of this resin. Preferably the mole ratio of ethoxylate to nonyl phenol/formaldehyde in the final product ranges between about 1–10 moles ethylene oxide per mole of the base alkyl substituted phenol-formaldehyde resin, and most preferably between about 1 to about 6 moles ethylene oxide per mole of base resin.

The surfactants which are found to be most useful are the surfactants or any combination or admixture of surfactants having an HLB between about 2.0–25.0, and which surfactants are chosen from the group consisting of alkoxylated fatty alcohol phosphates and alkanol amide condensates.

The alkanol amide condensate which is preferred is represented by the structure

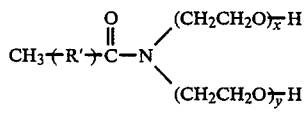

wherein R' represents an hydrocarbonaceous bridging group containing from 1-20 carbon atoms and chosen from the group consisting of linear and branched alkylene, alkyaryl, aralkyl, cyclic, and mixtures thereof. In the structure above x ranges from 0-8, y independently ranges from 0-8, provided that the sum of x+y is at least 1.

Of particular interest is the alkanolamide condensate represented as formula 1 above where R' is a hydrocarbonaeous bridging group having from 4-20 carbon atoms and chosen from linear or branched alkylene, alkaryl, aralkyl, and cyclic groups and mixtures of these groups. Preferably x and y range individually from 0-8, provided that the sum of x+y is at least 2. Most preferably, these alkanolamide condensates have R' ranging from 6-15 carbon atoms and chosen from either linear or branched alkylene groups, and have x or y both individually chosen from integers ranging from about 0-4, provided that the sum of x+y is at least 2.

The alkoxylated fatty alcohol phosphates are represented by the formulas below:

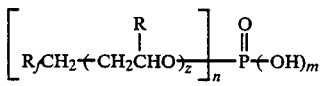

wherein $R_f$ is a fatty alkyl group having from 6-30 carbon atoms and being linear or branched or mixture thereof; R is hydrogen, methyl, or mixtures thereof; z ranges from between 1-12; n is at least 1; and m is equal to $3-n$; and where, in the sum, $n+m$ must always equal 3.

The ethoxylated nonyl phenol-formaldehyde resin, alkanolamide condensates, and alkoxylated fatty alcohol phosphates are normally present in the fluidizing formulations in weight ratios ranging from about 1:1:1 to about 20:10:0 to about 20:0:10. Preferably the weight ratios are between about 1:1:1 to about 20:10:1 to about 20:1:10.

These fluidized ingredients are added in an effective amount to the oily heavy slurries to achieve, with effective mixing, fluidization of these slurries to the point where they may be pumped using standard refinery equipment and pumps. Normally, this process requires at least 1000 ppm of a combination of the ethoxylated nonyl phenol-formaldehyde resin having a molecular weight ranging between 1000-25,000 and having been manufactured by reacting from about 25-75 weight percent ethylene oxide from about 75-25 weight percent of the nonyl phenol-formaldehyde base resin, said resin having itself been formed by reacting nonyl phenol with paraformaldehyde in a mole ratio ranging between about 1.5:1 to about 1:1.5. The combination also then includes the alkanolamide condensates represented by the structures outlined above as well as the alkoxylated fatty alcohol phosphates represented by the structures outlined above. The weight ratio of the ethoxylated nonyl phenol-formaldehyde:alkanol amide condensate:alkoxyated fatty alcohol phosphate ranges between about 1:1 to about 20:10:1 to about 20:1:10, when effectively used in these oily heavy slurries at a concentration of at least 1000 ppm, and in the presence of at least 5 weight percent water based on the total amount of oily heavy slurry to be treated.

A preferred process includes the treatment of the oily heavy slurries with at least 5 weight percent water, preferably between 5-25 weight percent water and at least 1000 ppm each of:

(a) a nonyl phenol/formaldehyde resin ethoxylated with from 25-75 weight percent, based on resin, of ethylene oxide, and (b) a combination of a weight ratio of 3:1 to 1:3 of a mixture of the alkanolamide condensates outlined above with the alkoxylated fatty alcohol phosphates outlined above, and further wherein the alkanolamide condensate is defined in a way that the bridging group contains from 6-16 carbon atoms and is linear or branched alkylene functionality and x and y both range from 0-4 provided that the sum of x+y is at least 2. Also, in this preferred technique, the alkoxylated fatty alcohol phosphate is defined such that $R_f$ contains 8-18 carbon atoms and is linear or branched alkyl functionality, z ranges from 1-8, n ranges between 1-2, and m is $3-n$.

Preferably the composition useful for fluidizing oily heavy slurries comprises from 15-85 weight percent water, from 5-40 weight percent of the ethoxylated nonyl phenol-formaldehyde resin having a molecular weight ranging between about 5000-15,000; and from 5-40 weight percent of the combination of the alkanolamide condensates represented by the structures above, wherein R' in a hydrocarbonaceous bridging group has from 1-20 carbon atoms and is chosen from linear or branched alkylene groups, alkaryl groups, aralkyl groups, cyclic functionality or mixtures thereof with the alkoxylated fatty alcohol phosphate represented by the structures above, where $R_f$ is fatty alkyl group having from 6-30 carbon atoms and chosen from linear or branched alkyl functionality, R is, at each occurrence, hydrogen, methyl or mixtures thereof, z is from 1-12, n ranges from 1-3, m is $3-n$ and sum $n+m$ must always be 3. Preferably each of the surfactants are present individually at levels of from 2.5-20 weight percent.

Each of these prior ingredients are then admixed with a hydrocarbon solvent, present between 5-75 weight percent, which solvent is chosen from the group consisting of naphthas, aromatic naphthas, heavy aromatic naphthas, alkylated aromatics, light aromatic solvents, petroleum distillates, turpentines, dipentene rich turpentines, and/or mixtures thereof.

To better describe our invention the following examples are given.

A Southwestern refinery had a tank containing a mixture of coke fines and very heavy oils. The material when analyzed contained between 70-90% coke fines. This mixture at ambient temperatures of from 60°-90° F. appeared to be semi-solid. The refinery could not remove this mixture from the tank in which it was stored in a way that it could be fed to an incinerator or any other waste handling facility. The refiner requested assistance.

One gallon of this semi-solid mixture was heated to a temperature of about 165° F. for a period of between 10-14 hours. At 165° F. this sample was blended by mixing, and aliquots of the admixture placed in several prescription bottles. To each of these bottles were added formulations which in turn were various combinations of water, emulsifiers, organic liquid solvents, and the phenol-formaldehyde resins described above. Other surfactants were also attempted.

The only combination which achieved a fluidized and pumpable admixture when the heavy coke fine slurries were treated in this way were formulations which contained the alkoxylated fatty alcohol phosphates, the alkanol amide condensates, and the ethoxylated nonyl phenol-formaldehyde resins described above. In particular, the best fluidization of these coke fines heavy slurries were achieved by adding a formulation, which, when added to the coke fine slurries, yielded a total water content of 5 weight percent and 1500 ppm each of an ethoxylated fatty alcohol phosphate known as ethoxylated oleyl alcohol phosphate provided commercially as EMPHOS TM PS-810 and an alkanolamide condensate known as N,N-(2-hydroxyethyl)-lauramide, both materials available commercially. These materials had been admixed prior to addition to the coke slurry with 5 weight percent of the indicated alkanolamide condensate, 5 weight percent of the indicated EMPHOS PS-810, 2.5 weight percent of a dipentene rich turpentine oil, and 87.5 weight percent of a heavy aromatic naphtha. The alkanolamide condensaate is available commercially as WITCOMID TM 5138 which is a water dispersible non-ionic surfactant. This blend was admixed prior to treating the coke slurry with an ethoxylated nonyl phenol-formaldehyde resin which contained about 5-6 moles of ethylene oxide per mole of nonyl phenol-formaldehyde resin and which had a molecular weight ranging between about 2500-10,000, as determined by gel permeation chromotography.
EMPHOS is a trademark of Witco Chemical Co.
WITCOMID is a trademark of Witco Chemical Co.

The treated coke slurry which contained 5 weight percent water and 1500 ppm each of the nonyl phenol resin described above and a 1:1 combination of the 2 surfactants described above remained fluid after cooling to room temperature and sitting for a period of about 8 hours. It would have been easily pumpable using standard reciprocating pumps, or other pumping means, available in a refinery.

A second experiment was tried using a cracking catalyst sludge which contained alumina/silica catalytic cracking fines in an oil slurry obtained from a refiner on the East Coast of the United States. Again, using an effective amount of a formulation which contained 5 weight percent water, and equal mixtures of the nonyl phenol-formaldehyde resin described above with, in turn, a 50/50 mixture of the EMPHOS PS-810 and the WITCOMID 5138, and all three organic actives dispersed in an aromatic solvent containing a dipentene rich turpentine oil achieved fluidization of these semisolid cracking catalysts sludges. However, to maintain fluidity over a period of time, it was necessary to additionally add between about 0.5 and 5.0 volume percent, based on total slurry volume, of isopropyl alcohol, or another water miscible alcohol, to maintain the stable and pumpable slurry originally achieved by the treatment of these cracking catalysts sludges as described.

Having described my invention, I claim:

1. A process for fluidizing oily heavy slurries chosen from slurries of catalyst fines in hydrocarbon, coke slurries in hydrocarbon, and asphalt residues in hydrocarbon which comprises:
   (1) Heating, with mixing, the oily heavy slurries to at least 140° F., thereby forming a heated heavy slurry;
   (2) Adding to said heated heavy slurry with mixing, an effective fluidizing amount of a fluidizing agent which comprises the ingredients:

| Ingredient | Wt. Percent |
|---|---|
| (a) water | 15-85 |
| (b) an ethoxylated nonyl phenol/formaldehyde resin having a molecular wt. between about 1000-25,000 | 40-5 |
| (c) Surfactants having an HLB between about 2.0-25.0, said surfactants chosen from the group consisting of alkanolamide condensates, alkoxylated fatty alcohol phosphates and mixtures thereof; and | 40-5 |
| (d) liquid organic solvents chosen from the group consisting of naphthas, aromatic naphthas, heavy aromatic naphthas, alkylated aromatics, light aromatic petroleum distillates, turpentine, dipentene rich turpentine, and mixtures thereof; thereby forming a heated treated heavy slurry, and then mixing effectively until the heated treated heavy slurry becomes fluidized and pumpable. | 75-5 |

2. The process of claim 1 wherein the oily heavy slurries are slurries formed by accumulated alumina/silica zeolitic catalyst fines settling from hydrocarbon cuts obtained from fluid catalytic cracking units.

3. The process of claim 1 wherein the oily heavy slurries are slurries of coke in hydrocarbon obtained from coking by-products within an oil refinery.

4. The process of claim 1 wherein at least 5 weight percent water, based on total weight of oily heavy slurry, is added to said slurry, in combination with at least 1000 ppm of a combination of:
   (a) an ethoxylated nonyl phenol-formaldehyde resin having a molecular weight ranging between about 1000-25,000 and having been manufactured by reacting from about 25-75 weight percent ethylene oxide with from about 75-25 weight percent of a nonyl phenol-formaldehyde resin, said resin having been formed by reacting nonyl phenol with paraformaldehyde in a mole ratio ranging between about 1.5:1 to about 1:1.5; and
   (b) an alkanolamide condensate represented by the structure:

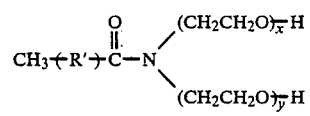

wherein R' represents an hydrocarbonaceous bridging group having from 1-20 carbon atoms and chosen from the group consisting of linear and branched alkylene, alkaryl, aralkyl, cyclic, and mixtures thereof, and
   x ranges from 0-8; and y ranges from 0-8; provided that the sum of x+y is at least 1; and
   (c) an alkoxylated fatty alcohol phosphate represented by the structure:

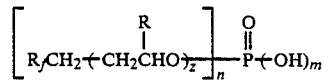

wherein:

$R_f$ is a fatty alkyl group having from 6–30 carbon atoms and being linear or branched; R is H, CH$_3$, or mixture thereof;

z ranges from 1–12; n is at least 1; and m is 3−n, and n+m equals 3;

and wherein the weight ratio of a:b:c ranges between about 1:1:1 to about 20:10:1 to about 20:1:10.

5. The process of claim 1, wherein the oily heavy slurries are treated with at least five weight percent of water and at least 1,000 ppm each of:

(a) a nonyl phenol formaldehyde resin ethoxylated with from 25–75 weight percent (based on resin) of ethylene oxide; and (b) a combination of a weight ratio of from 3:1 to 1:3 of a mixture of an alkanolamide condensate having the structure

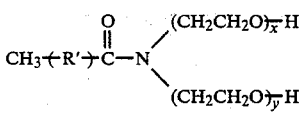

wherein R' has from 6–16 carbon atoms and is from linear or branched alkylene groups; and x and y both range from 0–4, provided the sum of x+y is at least 2; and an alkoxylated fatty alcohol phosphate having the structure:

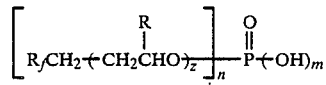

wherein $R_f$ contains from 6–16 carbon atoms and is linear or branched alkyl groups;

R is, at each occurrence, H or CH$_3$;

z ranges from 1–8;

n is 1–2; and m equals 3−n.

6. The process of claim 1, 2, 3, 4, or 5 which comprises the additional treatment of the oily heavy slurries with from 0.5 to 5.0 volume percent of a water miscible alcohol.

* * * * *